United States Patent Office 2,911,411
Patented Nov. 3, 1959

2,911,411

DERIVATIVES OF DIBENZO-CYCLOHEPTADIENE AND A METHOD OF PREPARING SAME

Georges Muller, Nogent sur Marne, Bruno P. Vaterlaus, Seine-Port, and Leon Velluz, Paris, France, assignors to UCLAF, Paris, France, a French body corporate No Drawing. Application July 2, 1957
Serial No. 669,468

Claims priority, application France July 10, 1956

6 Claims. (Cl. 260—326.5)

This invention relates to derivatives of dibenzo-cycloheptadiene and to a method of preparing same, and more particularly the present invention relates to a method of preparing new derivatives of 4,5-6,7-dibenzo $\Delta^{4,6}$-cycloheptadiene, I, resulting from a transformation of thiocolchicine and having an activity similar to that of colchicine.

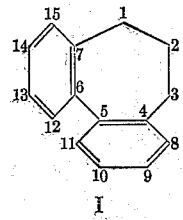

I

In copending patent application Serial No. 486,036 of February 3, 1955, now Patent No. 2,820,029, the applicant describes the preparation of thiocolchicine, II,

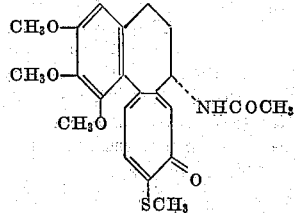

II. Thiocolchicine by the action of methyl mercaptan on colchicine. It was believed in the past that only those derivatives of colchicine which had preserved a tropolonic structure were capable of exerting the physiological activity of the starting product.

It has now been found that certain derivatives of dibenzo-cycloheptadiene, I, and, in particular, the lactam of 12,13,14-trimethoxy 9-methylthio 3α-amino 4,8-dihydro 4,5-6,7-dibenzo $\Delta^{4,6}$-cycloheptadiene 8α-carboxylic acid,

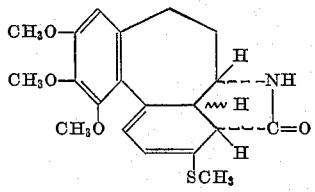

III. Cis-lactam referred to as "cis-lactam" hereinafter, as well as the lactam of 12,13,14-trimethoxy 9-methylthio 3α-amino 4,5-6,7-dibenzo $\Delta^{4,6}$-cycloheptadiene 8-carboxylic acid,

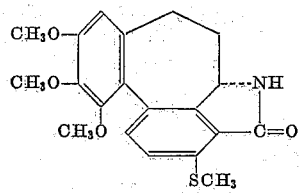

IV. Aromatic lactam referred to as "aromatic lactam" hereinafter, have an activity similar to that of colchicine and are useful for research work in plant genetics.

In order to prepare the "cis-lactam," identified as III hereinabove, the process of the present invention provides that an alkaline salt of methyl mercaptan is caused to react, in an anhydrous medium, with thiocolchicine, referred to as II hereinabove, at room temperature. This produces a mixture of products from which lactam, III herein, is isolated, which is then transformed into the aromatic lactam, hereinabove referred to as Formula IV, by the action of alkalies.

For the purpose of carrying out this process according to our invention, it is sufficient to prepare a solution of sodium or potassium methyl mercaptide in a suitable anhydrous solvent such as methanol, which can be done easily by passing a stream of methyl mercaptan in anhydrous methanol, wherein the desired quantity of sodium or potassium has previously been dissolved. The thiocolchicine, II, is then dissolved in the solution prepared in this manner, which is then allowed to stand at room temperature for two or three days. It is then taken up with a solvent, such as chloroform, dichloroethane or ether, which is not miscible with water, and the organic layer is washed with water. After the organic phase has been dried and the solvent evaporated, the "cis-lactam," III, is isolated by chromatography. The lactam, III, is allowed to stand in hydro-alcoholic, i.e., a water-alcohol, solution with sodium or potassium at room temperature for about 48 hours, whereby it becomes aromatic and forms compound IV which is isolated and purified by neutralizing the solution with a mineral or organic acid and then by extraction with a solvent which is not miscible with water. The solvent is evaporated, and the dry extract obtained produces, by means of crystallization, the desired pure aromatic lactam, IV.

With the above general considerations, there are given herein examples. These examples serve to illustrate the invention without, however, limiting its scope. It is to be noted that the melting points given herein are instantaneous melting points determined on the Maquenne block.

EXAMPLE 1

*The preparation of the lactam of 12,13,14-trimethoxy 9-methylthio 3α-amino 4,8-dihydro 4,5-6,7-dibenzo $\Delta^{4,6}$-cycloheptadiene 8-carboxylic acid, III ("cis-lactam")*

10 g. of thiocolchicine are dissolved in 60 cc. of anhydrous methanol containing 5.4 g. of sodium salt of methyl mercaptan. The solution is then allowed to stand at room temperature for three days, 200 cc. of chloroform are then added, and the solution is washed with water, dried over magnesium sulfate and vacuum evaporated to dryness. The residue which weighs 9.1 grams is taken up with 200 cc. of chloroform, and the resulting solution is treated chromatographically over 300 g. of neutral alumina.

Elution of the residue is carried out as follows: the first 300 cc. of chloroform are evaporated to dryness and yield 3.05 g. of a product which, when recrystallized in ethyl acetate, produces 1.9 g. of methyl ester of colchicic acid. The following 1250 cc. of chloroform permit the recovery of 2.7 g. of unchanged starting thiocolchicine. Finally, 1250 cc. of chloroform with 1% ethanol yield 4.3 g. of a product which is subjected to fractional crystallization, first in ethyl acetate and then in ethanol. This produces the desired cis-lactam III, M.P. above or equal to 258° C., $[\alpha]_j^{20} = -415° \pm 20$ ($c=0.5\%$, chloroform), in the form of yellow crystals, which are insoluble in water, ether, petroleum ether, slightly soluble in ethyl acetate and soluble in chloroform.

The infra-red spectrum reveals the presence of a 1.688 cm.$^{-1}$ band, which is characteristic of a $\gamma$-lactam.

Analysis of the product shows the formula of $$C_{20}H_{23}O_4NS = 373.5$$

Calculated: C=64.3%; H=6.2%; O=17.1%; N=3.8%; S=8.6%. Found: C=64.6%; H=6.3%; O=17.3%; N=3.8%; S=8.3%.

EXAMPLE 2

*Preparation of the lactam of 12,13,14-trimethoxy 9-methylthio 3α-amino 4,5-6,7-dibenzo $\Delta^{4,6}$-cycloheptadiene 8-carboxylic acid, IV ("aromatic lactam")*

250 mg. of the cis-lactam compound, III, prepared according to Example 1, are dissolved in 45 cc. of ethanol, 5 cc. of 10 N aqueous caustic soda, sodium hydroxide, are added, and the solution is left to stand at room temperature for two days. The solution thus obtained is neutralized with aqueous hydrochloric acid, extraction is carried out with chloroform, and the chloroform layer is decanted and dried over magnesium sulfate. Filtration and evaporation of the solvent produces the crude compound aromatic lactam IV, which is recrystallized in aqueous ethanol.

The above method produces 145 mg. of pure aromatic lactam, IV, M.P.=252° C., $[\alpha]_j^{20} = +85°$ ($c=0.5\%$, chloroform). The product is colorless, insoluble in water and petroleum ether, soluble in choloroform and ethanol.

The infra-red spectrum reveals the presence of a 1.692 cm.$^{-1}$ band, which is characteristic of a $\gamma$-lactam.

Analysis of the product shows the formula of $$C_{20}H_{21}O_4NS = 371.4$$

Calculated: C=64.7%; H=5.7%; O=17.2%; N=3.8%; S=8.6%. Found: C=64.6%; H=5.8%; O=16.8%; N=3.7%; S=8.2%.

From the foregoing description of our invention it will be noted that we have provided derivatives of dibenzo cycloheptadiene and a method of preparing the same.

It will be noted also that suitable solvents and agents of the mercaptide group may be utilized in reactions with colchicine and the resultant thiocolchicine is then further treated to obtain cis-lactam and aromatic lactam.

It is to be noted that there are obtained new products according to the present invention, which products are useful in agriculture.

While preferred examples have been disclosed, it is to be understood that modifications as to use of materials, solvents and agents and procedure may be made without departing from the spirit and scope of the invention as claimed.

We claim:

1. The process according to claim 6 wherein the sodium methyl mercaptide in anhydrous methanol is reacted with thiocolchicine for two days.

2. The process according to claim 6, wherein cis-lactam is aromatized by the action of hydro-alcoholic solution of an alkaline metal at room temperature for about 48 hours and purified after extraction by recrystallization in aqueous ethanol.

3. The lactam of 12,13,14-trimethoxy 9-methylthio 3α-amino 4,8-dihydro 4,5-6,7-dibenzo $\Delta^{4,6}$-cycloheptadiene 8α-carboxylic acid.

4. The lactam of 12,13,14-trimethoxy 9-methylthio 3α-amino 4,5-6,7-dibenzo $\Delta^{4,6}$-cycloheptadiene 8-carboxylic acid.

5. The tropolene compounds of the formula

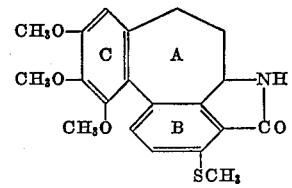

wherein ring B is a ring selected from the group consisting of the 4,8-dihydrophenyl ring and the phenyl ring.

6. The process of preparing new derivatives of 4,5-6,7-dibenzo-$\Delta^{4,6}$-cycloheptadiene, comprising adding an alkali metal mercaptide, in an anhydrous solvent, to thiocolchicine, dissolving said thiocolchicine in said solvent, washing the reaction mixture with water, evaporating the washed solution to dryness, dissolving the residue in chloroform, passing the chloroform solution through chromatographic neutral alumina, eluting said alumina by means of chloroform, isolating the resulting lactam of 12,13,14-trimethoxy-9-methylthio-3α-amino-4,8-dihydro-4,5-6,7-dibenzo-$\Delta^{4,6}$-cycloheptadiene-8-carboxylic acid from the eluate, recrystallizing said compound from ethyl acetate and ethanol to purify the same, and aromatizing said lactam by means of an alkali to the lactam of 12,13,14-trimethoxy-9-methylthio-3α-amino-4,5-6,7-dibenzo-$\Delta^{4,6}$-cycloheptadiene-8-carboxylic acid.

References Cited in the file of this patent

Eigsti et al.: Colchicine. In Agriculture, Medicine, Biology, and Chemistry, 1955. 470 pp. Ames: Iowa State College Press.